Dec. 28, 1926.
F. A. GODDARD
1,612,188
SHOCK ABSORBING DEVICE
Filed Oct. 9, 1924     2 Sheets-Sheet 1
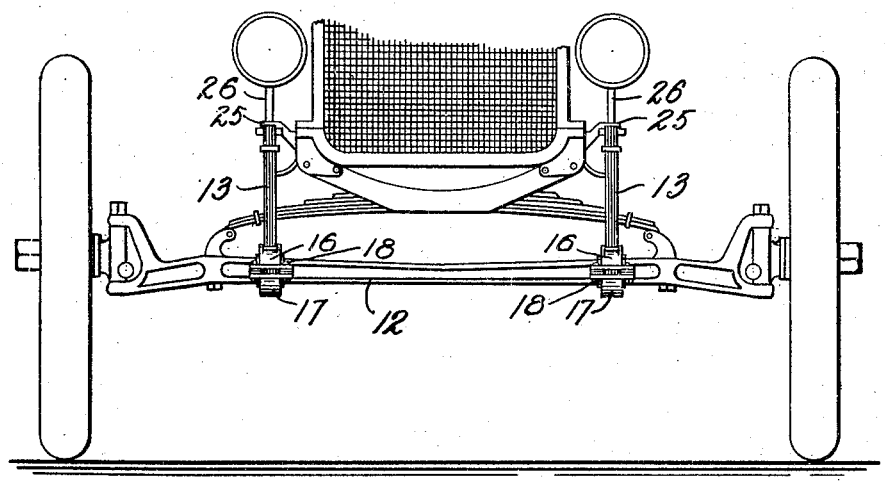
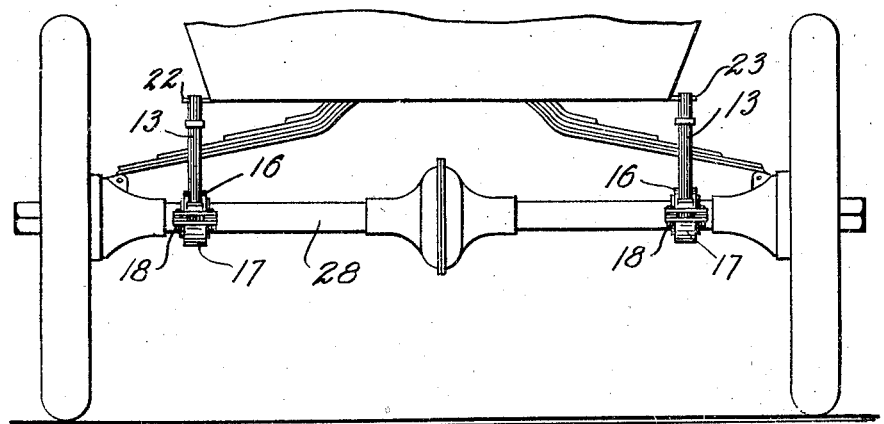

Dec. 28, 1926.
F. A. GODDARD
SHOCK ABSORBING DEVICE
Filed Oct. 9, 1924      2 Sheets-Sheet 2
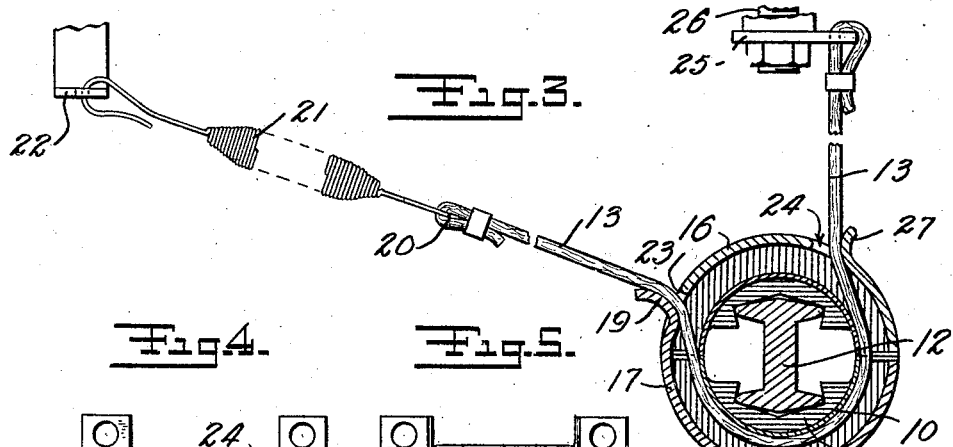
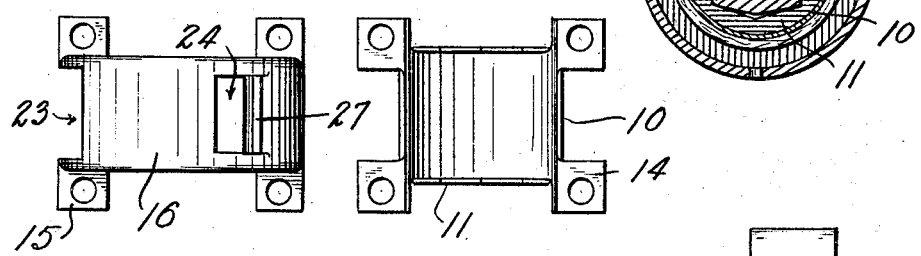
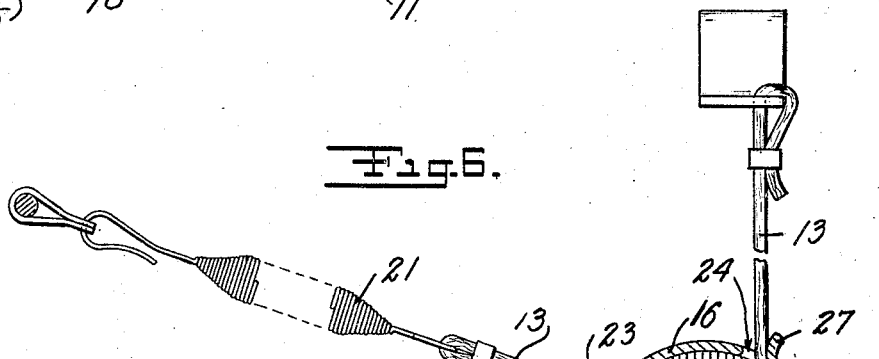
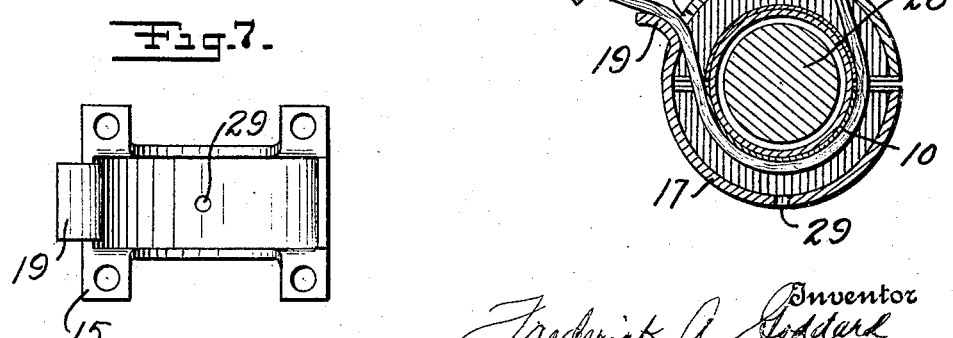
Inventor
Frederick A. Goddard
By his Attorney
Frank J. Kent Patented Dec. 28, 1926.

1,612,188

UNITED STATES PATENT OFFICE.

FREDERICK A. GODDARD, OF NEW YORK, N. Y., ASSIGNOR TO AUTOMOTIVE HARDWARE CORPORATION, OF NEW YORK, N. Y.

SHOCK-ABSORBING DEVICE.

Application filed October 9, 1924. Serial No. 742,547.

This invention relates to vehicle shock absorbing devices of the snubber type.

In my prior application Serial No. 725,588, filed July 12, 1924, I have described and claimed a shock absorbing device of this general type in which a cable or other rounded tensile member is employed which engages a friction drum member in a manner to produce a crossing of the extended portions of the tensile member which are attached to the vehicle framework.

A general object of the present invention is to make use of a tensile member in the form of a flat strip of webbing or the like and to avoid the crossing of sections of the webbing with resultant frictional engagement of the edges of the webbing with each other.

The invention includes the use of a friction drum and enclosing casing so formed as to cause the flexible tension member to engage a considerable portion of the circumferential area of the friction drum in order to obtain the advantage of the maximum frictional braking effect.

Another feature of the invention resides in the mounting of the brake drum and casing members on the vehicle axles in such manner that there can be no relative rotation of the parts.

Other features of the invention will be hereinafter referred to.

In the drawings, in which a preferred embodiment of the invention has been selected for illustration, Figure 1 is a view in front elevation of a portion of a vehicle equipped with shock absorbing devices embodying the invention.

Figure 2 is a view in rear elevation of the vehicle showing the shock absorbing devices applied to the rear axle.

Figure 3 is a view in side elevation and partly in section of a braking device adapted for use on the front axle of a vehicle.

Figure 4 is a plan view of the upper part of a casing member forming part of the shock absorbing device.

Figure 5 is a plan view of a section of a friction drum member formed to be mounted in non-rotative relation to a front vehicle axle.

Figure 6 is a view similar to Figure 3 showing a shock absorbing device adapted to be mounted on the rear vehicle axle.

Figure 7 is a view similar to Figure 4 showing in plan view a lower brake drum casing member.

Referring to the drawings for a more detailed description of the invention, a brake drum formed of two identical sections 10 are provided with end flanges 11 formed to fit the upper and lower flanges of the I-beam section of the front axle 12. The brake drum sections 10 together form a cylindrical member whose outer surface is adapted to be engaged by a tensile member 13 formed of a flat strip of webbing or other suitable material. In order to hold the brake drum sections 10 in position of the axle, ears 14 are provided at each corner portion thereof, the ears of the two sections being placed in contact with each other and between corresponding ears 15 formed at the corner terminal portions of a brake drum casing comprising an upper section 16 and a lower section 17. With the ear members 14 and 15 thus placed in superposed relation, suitable bolts 18 or other attaching means are passed through openings in the ears to clamp the parts rigidly together.

It will be seen that the terminals of the brake drum sections 10 and the casing sections 16 and 17 occur in the sides of the device and lie in substantially the same horizontal plane. This construction facilitates the provision of a guiding or directing flange member 19 on the lower casing member 17 across which the substantially horizontal projecting portions of the tensile member 13 extends to its point of connection at 20 with a spring element 21 which is placed intermediate the terminal portion of the tensile member and a point of attachment 22 on the vehicle framework. The directing flange 19 of the casing 17 is so positioned that the adjacent portion of the tensile member 13 is caused to engage a more considerable area of the brake drum surface than would be the case if the extended section of the tensile member 13 was coincident with a tangent to the brake drum surface and extending through the point of attachment 22.

The upper casing member 16 of the brake drum casing is cut away at 23 to accommodate the elevated flange portion 19 of the lower casing member 17 and to provide an opening or passage through which the tensile member 13 projects.

The upper casing section 16 is also provided with an opening 24 through which the substantially vertical portion of the tensile member 13 extends to a point of connection 25 substantially directly above the opening 24 and coincident with the lower end of the lamp bracket 26 carried by the vehicle. In order to provide a guide for the tensile member and to prevent engagement of the tensile member with a cutting or abraiding edge at its point of passage through the opening 24 a curved flange member 27 is provided which may be a simple tongue member turned up out of the opening 24 formed in the casing member. The position of the guiding flange member 27 is such as to cause the tensile member to engage a greater portion of the area of the friction drum 10 than would be the case if the opening 24 were directly above the right-hand extremity of the brake drum as viewed in Figures 3 and 6 of the drawing.

The shock absorbing device shown in Figure 3 is adapted for mounting on the front axle of the vehicle as has been pointed out. A different form of brake drum construction is required for mounting on the rear axle 28 which is round or circular in section. In Figure 6 of the drawing is shown a shock absorbing device adapted for mounting on the rear axle 28. In this construction the flange 11 on the lower brake drum section 10 which is made use of in Figure 3 to fit the front axle member, is absent and the brake drum sections in this case are formed to fit the circular contour of the axle on which they are mounted.

The device is readily placed in position on the respective axles and the ends of the tensile member attached to suitable positions on the vehicle body above. In order to prevent the accumulation of foreign matter such as dust, oil and water in the lower casing member 17, drainage openings 29 are provided in the lower walls of the casing member 17.

What I claim is:—

1. In a vehicle shock-absorbing device of the snubber type, a friction drum comprising upper and lower sections adapted to be mounted in enclosing relation to a vehicle axle, a casing comprising upper and lower sections enclosing the drum member and provided in the upper section thereof with two openings substantially less than 180 degrees apart, curved guide flanges on the farthest separated edges of the openings, and a flat tensile member engaging the surface of the drum and passing through said openings.

2. In a vehicle shock-absorbing device of the snubber type, a friction drum comprising upper and lower sections adapted to be mounted in enclosing relation to a vehicle axle, a casing comprising upper and lower sections enclosing the drum member and provided in the upper section thereof with two openings substantially less than 180 degrees apart, outwardly curved guide lip members formed on the outermost edges of the openings, and a tensile member of the flat strip webbing type engaging said drum member and passing through said openings, said casing being provided in its lowermost wall section with a drain opening.

3. In a vehicle shock absorbing device of the snubber type, a friction drum comprising upper and lower sections adapted to be mounted in enclosing relation to a vehicle axle, a two-part casing comprising upper and lower sections enclosing the drum member, said upper section of the casing being provided with an opening adjacent one end, said lower section of the casing having a terminal curved lip member forming a flanking edge for said opening, said upper section of the casing being provided with another opening spaced less than 180 degrees from the first-named opening, and a flat strip tensile member engaging said drum and passing through said openings.

4. In a vehicle shock-absorbing device, a friction drum comprising upper and lower sections adapted to be mounted in enclosing relation to a vehicle axle, a two-part casing comprising upper and lower sections enclosing the drum member, said upper section of the casing being provided at one end with a slot extending circumferentially therein, said lower section of the casing having a curved lip member extending into said slot but having an opening through which a tensile member may pass, said upper section of the casing being provided with an opening spaced circumferentially less than 180 degrees from said slot, a curved lip member formed on the outer edge of said opening, and a flat tensile member engaging said friction drum and passing through said openings.

5. In a vehicle shock-absorbing device, a two-part friction drum comprising upper and lower sections adapted to be mounted in enclosing relation to a vehicle axle, a two-part casing comprising upper and lower sections enclosing the drum member, the friction drum sections being provided with ears at the corner portions, the casing sections being provided with ears adapted to be clamped in enclosing relation to the ears on the drum to prevent relative rotation of the drum and the casing, the upper section of the casing being provided with openings spaced circumferentially less than 180 degrees apart, curved lip members on the most remotely separated edges of the openings, a flat tensile member passing through said openings to points of attachment on the vehicle body, and a spring member included in said tensile member.

In testimony whereof I affix my signature.

FREDERICK A. GODDARD.